July 24, 1923.
H. P. MILKER ET AL
THERMOMETER
Filed Nov. 6, 1919
1,462,797
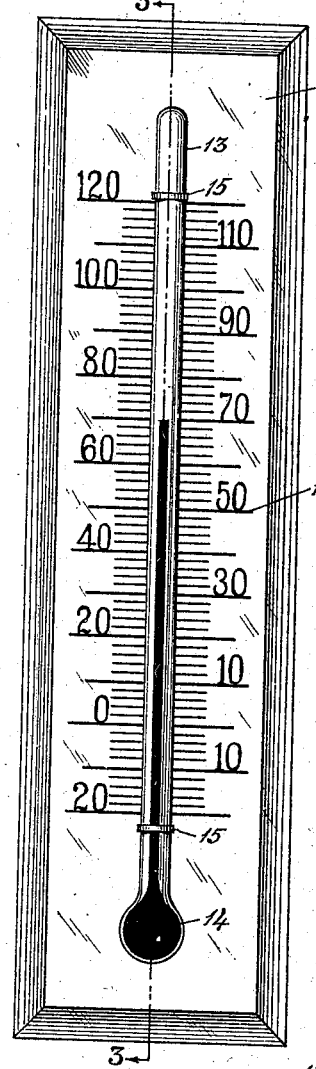
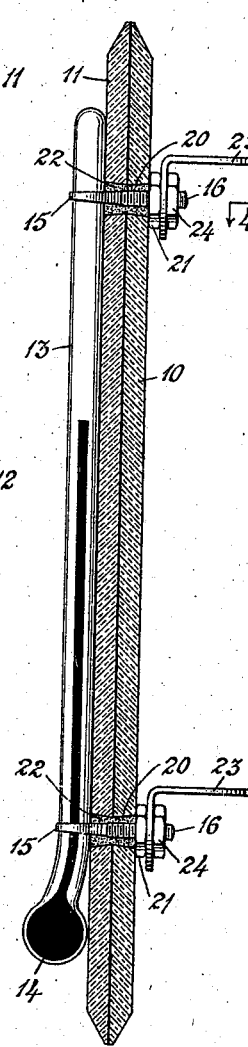
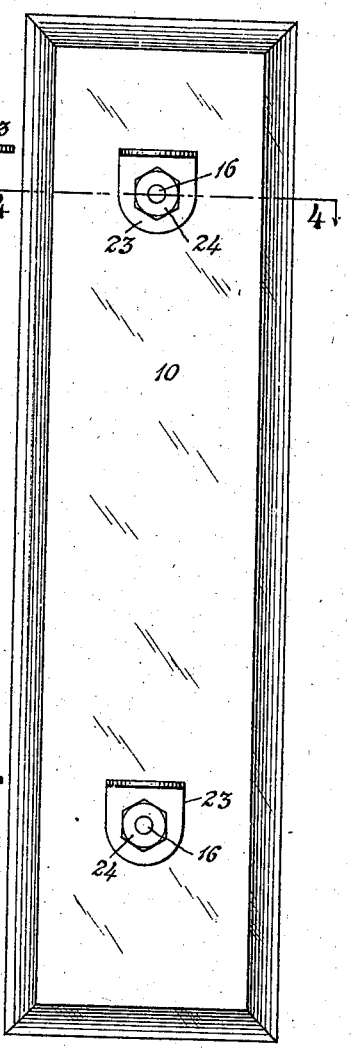
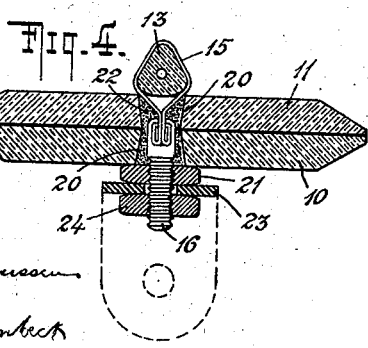
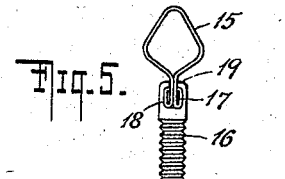
WITNESSES
INVENTORS
Herbert P. Milker
Alfred Roesch
BY
Briesen & Schrenk
ATTORNEYS Patented July 24, 1923.

1,462,797

UNITED STATES PATENT OFFICE.

HERBERT P. MILKER AND ALFRED ROESCH, OF BROOKLYN, NEW YORK, ASSIGNORS TO CHARLES J. TAGLIABUE MANUFACTURING CO., OF BROOKLYN, NEW YORK, A CORPORATION OF NEW YORK.

THERMOMETER.

Application filed November 6, 1919. Serial No. 336,101.

*To all whom it may concern:*

Be it known that we, HERBERT P. MILKER and ALFRED ROESCH, both citizens of the United States, and residents of the borough of Brooklyn, county of Kings, city and State of New York, have invented certain new and useful Improvements in Thermometers, of which the following is a specification.

Our invention relates to thermometers of the type in which the thermometer tube is secured to the scale plate or back and wherein it is necessary to prevent shifting of said tube relatively to said scale in order that the accuracy of the instrument may be preserved. Because of the above requirement, it has heretofore been necessary to provide the tube at its upper end with a nib and the back or scale-plate with a cooperating recess or hole, which, in order to secure the desired results, require a substantially perfect fit of the nib in the hole, thus materially increasing the cost of production of the instrument. Our invention has for its object to overcome these difficulties and disadvantages by doing away with the nib and opening and providing a novel device whereby the tube is secured upon the back or scale plate in a reliable and efficient manner. Other more specific objects of our invention will appear from the description hereinafter and the features of novelty will be pointed out in the appended claims.

For the purposes of illustration and description, and without intending to actually define the limits of the invention, we have chosen a glass plate window thermometer, it being understood that the improvements are not restricted to this type of instrument. Accordingly, in the accompanying drawings, Figure 1 is a front elevation of a thermometer including a specific embodiment of our invention; Fig. 2 is a rear elevation thereof; Fig. 3 is a detail vertical section on the line 3—3 of Fig. 1; Fig. 4 is a horizontal section on the line 4—4 of Fig. 2; and Fig. 5 is a detail view of the combined tube securing device and supporting means.

The thermometer shown in the illustrated example comprises a back or scale-plate consisting of two sheets or plates of glass 10 and 11, joined together in surface engagement by means of a suitable cement or otherwise and preferably bevelled throughout their peripheral edges, as shown in Fig. 4. For the purpose of increasing the readability of the thermometer, the rear plate 10 may be of translucent glass upon the inner face of which a suitable scale 12 is produced in any convenient and well known way so as to be visible through the front plate 11 of transparent glass. A thermometer tube 13 of the usual kind having a bulb 14 at one end extends lengthwise of the front plate 11 upon a surface thereof and in proper relation to the scale 12.

The tube securing devices which constitute the novel and essential features of the present invention comprise bands 15 of metal having a certain inherent ductility or elasticity such as, for instance, Monel metal, said bands having their free ends secured to screw-threaded studs 16 either mechanically, by brazing, or in any other suitable manner. The preferred manner of connecting said bands with said studs consists in turning back the ends of said bands 15 upon themselves as indicated at 17 and cutting a slot 18 in the inner end of each stud 16, the depth of the slot being greater than the extent to which said ends of the bands are turned back. These turned back ends 17 are inserted in the slots 18 and secured therein after which those portions of the studs 16 which lie beyond or above the turned back ends 17 are upset as indicated at 19 in Fig. 5 to firmly embed the band ends in the stud ends. The bands 15 pass about the thermometer tube 13 and into holes 20 which extend through the plates 10 and 11, which in the illustrated example constitute the scale-plate or back, the studs 18 projecting through said holes and beyond the outer surface of the rear plate 10. Nuts 21 are located upon the studs 16 in engagement with the plate 10 and serve to secure the tube 13 in position through the medium of the bands 15 and studs 16; in order to rigidly and securely fix the bands 15 and studs 16 in the holes 20 the latter, which are somewhat oversize, are filled with litharge 22 or other cement or equivalent substance, as shown in Figs. 3 and 4. In combining the parts with the scale-plate or back or specifically with the plates 10 and 11, the bands 15 and the studs 16 are inserted through the holes 20 so that the bands 15 project beyond the front face of the plate 11 or the corresponding face of backs of other types, in the form of loops through which the tube 13 is inserted. The latter is properly adjusted relatively to the scale 12 and is held in position against shifting in any convenient manner, after which the nuts 21 are placed upon the studs 16 and screwed home thereon against the rear surface of the scale-plate or back represented in the present instance by the outer face of the rear plate 10. As the screwing up of the nuts 21 on the studs 16 is continued after said nuts have contacted with the plate 10 or its equivalent, the studs 16 will be drawn in the direction of their axes in the holes 20 and will thereby bring the bands 15 under tension. The tensioning of the bands 15 in the described manner, which, because of the ductility of the material, causes the bands to stretch somewhat, is continued until said bands 15 grip the tube 13 with sufficient force to firmly secure it in place upon the plate 11 against unintentional displacement relatively to the scale 12, this condition being reached before the limit of the ductility inherent in said bands 15 is reached. After the tube 13 has been thus firmly fastened in place the holes 20, which as before stated are somewhat oversized, are filled with the litharge 22 or equivalent substance which is then permitted to harden, whereby the bands 15 and studs 16 are cemented or litharged in the plates against any further relative movement.

As shown in the illustrated example, the tube securing devices may be constructed so as to accommodate brackets or equivalent devices whereby the thermometer may be supported in operative position, the screwthreaded ends of the studs 16 being made somewhat longer than when used only as tube securing devices. In such cases when the litharge 22 or its equivalent has fully hardened, brackets 23 which may be of any suitable construction, or their equivalents may be placed upon the projecting ends of the studs 16 against the nuts 21 and secured thereon by means of additional nuts 24. In other words, the brackets 23 or their equivalents, are clamped between the nuts 21 and 24, the screwing up of the latter having no effect upon the bands 15 because of the protection afforded by the nuts 21 and because the studs 16 are rigidly secured against movement in said holes 20.

It will be understood that sufficient inherent ductility remains in the bands 15, after the parts have been combined as described, to permit said bands to accommodate themselves to any expansion and contraction of the tube under temperature changes, without injuring or fracturing said tube 13.

In the production of thermometers, and particularly in the manufacture of glass window thermometers, a considerable item of cost is the drilling of holes through the back or scale-plate, at least five such holes having, generally speaking, been required in the case of window thermometers; that is, two for affixing the devices whereby the thermometer is attached to the window casing or other support, and two similar holes for the accommodation of the devices whereby the thermometer tube is attached to the back. In addition, as previously stated, it has heretofore been necessary to provide a nib hole, as it is termed, arranged to receive a nib provided at the top of the thermometer tube to prevent shifting thereof. To secure the latter result, the nib and nib hole must correspond exactly in diameter in order that the nib may snugly fit the nib hole, which result is, however, difficult to attain and therefore expensive. Lastly, the nib hole must be located on the back with exactitude so that the test points of the tube will correspond with the scale, which introduces further difficulties because the nib hole must be located, in each thermometer, to suit each individual tube. The above objections are overcome, or at least reduced in the present invention, by making it necessary to drill only two holes for the accommodation of the tube securing devices, which may also constitute supporting means and which secure the tube so immovably in position as to obviate entirely the necessity for the troublesome nib hole as well as the co-operating nib upon the tube.

The invention is extremely simple in construction and economical to produce and may be operatively utilized without the necessity for any specially skilled labor.

With the present improvements, it is possible to use tube-securing devices in which the bands 15 are of given dimensions, for securing tubes 13 of different cross-sectional sizes without in any way interfering with the efficiency of the device, thus making it possible to still further reduce the cost of manufacture by reducing the variations required in the bands, to a minimum; the above particularly applies to those types of thermometers which include a relatively thick back. Heretofore it has been necessary to select clips of a size nearest to the cross-sectional dimensions of the tube in order to secure satisfactory results.

The invention provides a simple and effective device whereby the tube is efficiently secured upon the back or scale plate against shifting relatively to the scale and may, as illustrated, constitute a medium whereby supporting devices are attached to the thermometer. In the latter case, the attractiveness of the thermometer is increased by having the supporting devices concealed from view. The invention is applicable to all types of thermometers in which a tube is fastened upon a scale-plate or back.

It will be understood that the details of construction and shape of the parts may be varied and that other changes in the specific form shown and described may be made within the scope of the claims without departing from the spirit of our invention.

We claim:

1. A thermometer comprising a back provided with at least one hole and having a scale thereon, a tube on said back, a screw-threaded stud in said hole, a band extending about said tube and projecting into said hole and connected with said stud, and a nut on said stud whereby said band is drawn into conformity with the top and side surfaces of said tube unrestrained by any portion of said back and the tube is clamped on said back against movement relatively to said scale.

2. A thermometer comprising a back provided with two holes and having a scale thereon, a tube on said back, bands extending about said tube and into said holes, screw-threaded studs in said holes connected with said bands and projecting rearwardly beyond said back, nuts on said studs whereby said bands are adjusted and placed under tension unrestrained by any portion of said back to fix said tube relatively to said scale and a cement in said holes for securing said bands and studs therein after adjustment of said bands has been effected.

3. A thermometer comprising a glass back provided with two holes and having a scale thereon, a tube on said back, bands extending about said tube and into said holes, screw-threaded studs in said holes connected with said bands and projecting rearwardly beyond said back, nuts on said studs whereby said bands are placed under tension to fix said tube relatively to said scale, brackets on said studs for operatively supporting said thermometer and nuts whereby said brackets are secured on said studs.

In testimony whereof we have hereunto set our hands.

HERBERT P. MILKER.
ALFRED ROESCH.